United States Patent [19]
Thomas et al.

[11] Patent Number: 6,131,774
[45] Date of Patent: Oct. 17, 2000

[54] FLOWABLE MATERIAL DISPENSER WITH AUTOMATIC SHUTOFF AND VESSEL FOR RECEIVING FLOWABLE MATERIAL

[75] Inventors: John E. Thomas, River Falls, Wis.; James L. Copeland, Apple Valley, Minn.; Jamie W. Lerbs, Mendota Heights, Minn.; Roy F. Johnson, St. Paul, Minn.

[73] Assignee: Ecolab Inc., St. Paul, Minn.

[21] Appl. No.: 09/056,941

[22] Filed: Apr. 8, 1998

[51] Int. Cl.[7] ..................................... B67D 5/06
[52] U.S. Cl. ................. 222/181.2; 222/440; 222/518
[58] Field of Search ........................... 222/181.2, 185.1, 222/438, 440, 518

[56] References Cited

U.S. PATENT DOCUMENTS

| 1,339,163 | 5/1920 | Close | 222/181.2 |
| 4,151,934 | 5/1979 | Saeki | 222/440 |
| 4,886,193 | 12/1989 | Wassilieff | 222/446 |
| 5,154,212 | 10/1992 | Weber | 222/518 |
| 5,706,985 | 1/1998 | Feer | 222/518 |
| 5,725,131 | 3/1998 | Bell et al. | 222/196 |

FOREIGN PATENT DOCUMENTS

| 0 403 171 | 12/1990 | European Pat. Off. | |
| 597594 | 8/1959 | Italy | 222/185.1 |
| WO 96/38715 | 12/1996 | WIPO | |

OTHER PUBLICATIONS

British Search Report

*Primary Examiner*—Joseph A. Kaufman
*Attorney, Agent, or Firm*—Merchant & Gould P.C.

[57] ABSTRACT

A flowable material dispensing system that will dispense a flowable material into a container and stop dispensing when the proper level is reached in the container. The container has an actuating device that is used to open the valve on the container. As the flowable material flows into the container and reaches the top, flow stops.

20 Claims, 5 Drawing Sheets

FLOWABLE MATERIAL DISPENSER WITH AUTOMATIC SHUTOFF AND VESSEL FOR RECEIVING FLOWABLE MATERIAL

FIELD OF THE INVENTION

The invention is directed generally to dispensing flowable materials and specifically to dispensing predetermined amounts of flowable materials. The invention is directed more specifically to automatic limit control for dispensing a predetermined volumes of flowable material.

BACKGROUND OF THE INVENTION

A large number of different chemicals are available as flowable materials, which can include liquids, granules, pellets and powders. A variety of products can be formulated in these product formats. Examples of powders and granules include laundry detergents, presoak materials, floor cleaners and fertilizers. Pellets can comprise compressed alkaline detergent formulations for warewashing or laundry. Although these materials are commonly used in dilute aqueous form, they are frequently stored and shipped as solids in order to conserve considerable space and weight during transportation and warehousing. Because these materials generally need to be dissolved in water to create a dilute use solution, dispensing precise and accurate predetermined quantities is needed. Materials can also be stored as concentrated liquids. In this case, the dispensed material must be diluted to form the concentrate prior to final dilution at the end use. If the material in question is under-dispensed, the resulting use solution will be excessively dilute and possibly ineffective. Conversely, if too much material is dispensed, the resulting use solution will be too concentrated, which wastes material and possibly represents an unsafe condition. For example, if the flowable material is fertilizer, a too-concentrated use solution can burn the plants being fertilized.

Because these materials represent a significant expense, it is important to be able to dispense them without waste or spillage. In addition, it should be noted that many materials are restricted in their permitted release to the environment. Since spills can contribute to the amount of material released, it is important to minimize them. A substantial need exists for an accurate, easy-to-operate flowable material dispensing system which is capable of repeated accurate and precise dispensing of various predetermined amounts of material without spillage.

SUMMARY OF THE INVENTION

We have found a flowable material dispensing system which consists of a valved gravity-flow container suitable to hold a volume of flowable material. The system comprises a stand suitable to hold the gravity-flow container in a dispensing position for gravity-flow, a valve which fits into an aperture in the container; and a receiving vessel that interacts with the valve via an actuating device in order to permit dispensing of the flowable material until said vessel is full. A limiting portion of the valve terminates dispensing of the flowable material when the vessel becomes full. The term "flowable material" means any material, liquid, powder, granule or pellet, that can be readily transferred by action of gravity feed through an opening of about 0.5 to 5 in$^2$.

The flowable material dispenser system of the invention comprises a flowable material container with a sufficient capacity of flowable material for multiple dispensing cycles. The flowable material is dispensed into a material vessel having a predetermined volume. Such volume is adapted to diluting the flowable material with a predetermined volume of water at a fixed predetermined dilution ratio to form a use solution comprising the dissolved flowable material in an aqueous or non-aqueous liquid. If the flowable material itself is a liquid, the use solution is formed by diluting said material.

The bulk flowable material container comprises mounting apertures or grooves that cooperate with the stand to maintain the container in a dispensing mode for gravity-feed purposes. The bulk material container is valved to permit easy dispensing of the flowable material into the vessel. The valve comprises a disc with a valve seat and a movable circular valve closure. The closure has a closed position in contact with the valve seat in an open position in which the valve is moved inwardly with respect to the container into the flowable material volume permitting the free-flowing material volume to flow around the circular closure through the valve seat opening and into the vessel.

Movement of the valve is obtained using a valve actuator probe on the flowable material vessel. The valve actuator probe contacts an actuator post connected to the circular valve closure. The vessel having the actuator probe is moved against the actuator post which moves the valve closure from the seat opening the seat opening permitting flow of the flowable material from the container into the vessel. The valve assembly also contains a skirt member which extends from the exterior of the container for a distance such that the end of the skirt penetrates the opening of the vessel by at least one millimeter, preferably 5 to 10 millimeters. This distance is necessary to ensure that material is not dispensed if the skirt configuration fails to fit within the confines of the receiving vessel. As the flowable material is transferred through the valve into the vessel, the flowable material fills the vessel. As the top of the material in the vessel approaches the skirt, the flowable material can flow unimpeded. When the top of the material contacts the bottom of the skirt, flow from the container is prevented. This self-limiting function of the valve skirt is an important aspect of the invention and permits the easy and convenient dispensing of a predetermined volume of flowable material for dissolution or dilution in the predetermined volume of liquid.

The circular closure and post is spring biased to maintain the valve in a closed position. The actuator probe moves the circular closure against the action of the spring to open the valve for material dispensing. When flowable material dispensing is completed due to the self-limiting nature of the skirt, the spring can then move the circular aperture to a closed position. The circular closure has a lower conical portion which cooperates with the seat to close the valve. The upper portion of the circular closure also has an upper conical surface that permits easy flow of the flowable material around the circular closure.

In order to obtain secure contact between the actuator probe and the actuator post, the post contains a receiving surface comprising a cylindrical mating surface that accepts and holds the actuator probe in place during dispensing. The valve is commonly manufactured in the form of a valve member with a threaded closure that mates with a threaded opening in the container. The flowable material vessel receiving the flowable material from the flowable material container may be a substantially cylindrical vessel with a movable platform that defines a predetermined volume. The flowable material vessel is not limited to cylindrical shapes, however. The vessel can have a variety of shapes and a variety of apertures which correspond with a variety of complementary skirt configurations. A preferred stand member comprises a wire stand that holds the container in a dispensing mode.

In a particular embodiment, the flowable material is a powder.

DETAILED DISCUSSION OF THE INVENTION

The invention is directed to a flowable material dispensing system which comprises a gravity-feed valved container suitable to hold a volume of flowable material. The container cooperates with a stand to hold the container in a dispensing attitude. The valved system comprises a valve assembly which fits onto a threaded aperture in the container that controls gravity-feed dispensing. A receiving vessel that interacts with the valve assembly via an actuating device initiates dispensing of the flowable material while said cup is not full and terminates dispensing of the flowable material when the cup becomes full. Each major element of the invention will be discussed in turn.

Material Container

The invention utilizes a container suitable to hold a volume of flowable material. The container further defines a round aperture whereby the flowable material can depart the container when the container is in a gravity-feed or dispensing attitude. The container may be designed in such a way that product can be sealed into the container via a cap or sealing apparatus and shipped. There may be an optional handle molded into the bottom surface of the container to ease handling. In another embodiment of the invention, the flowable material container is a refillable hopper. This hopper is open at the top to facilitate refilling. In other embodiments, the container could also be a bottle, pail or even a drum. There are no specific limitations on container volume. Said volume would depend on the nature of the material being dispensed. The cap or sealing apparatus can be replaced with a valved assembly or while intact prior to product use can be equipped with a round knock-out which permits installation of a gravity-feed valve assembly. The cap or apparatus is then used (minus center knock-out) to hold the valve assembly in place on the container. Preferably, the container is transparent, translucent or includes a viewing port, permitting the end user to see the contents. The container has means, slots or inserts that cooperate with a stand to position the container for flowable material dispensing.

Stand

The present embodiment of the invention includes a stand which is suitable to hold the container in a gravity-feed attitude. Preferably, the stand is constructed of metal wires, permitting easy container installation and removal. The stand is able to be mounted onto a vertical surface such as a wall for convenience. Depending on the size of the container used, the stand may be freestanding on the floor. Further, a user is able to easily see the container and its contents, thereby judging when replacement is necessary.

Valve Assembly

The heart of the claimed invention is the valve assembly that dispenses a predetermined volume of the flowable material. The valve can be fitted onto a threaded aperture of the material container and includes three individual components (i.e.) the disc and seat, the closure and the skirt, as described below:

Disc and Seat

This is a flat cylindrical disc of diameter equal to the aperture in the material container, wherein the top surface of the disc is slightly concave and defines a round aperture or valve seat, wherein the bottom surface comprises a skirt acting as a flow stopper with an inner diameter approximately equal to the round seat or aperture. The skirt can take many possible shapes and is not limited to a cylindrical shape. This flow stopper operates in concert with the valve to control flow. The disc further comprises a support piece extending across the round aperture, said support piece defining a smaller round aperture through which a metal stem can slide and further providing support for a spring. The bottom surface of the disc further comprises a lip slightly larger in diameter than the aperture in the container. This lip serves to hold the valve assembly within the container aperture without falling into the container. The cap serves to prevent the valve assembly from falling out.

Actuator Post or Stem

A metal stem which protrudes through the aperture through the support piece; wherein the bottom end of the stem forms a larger diameter cup suitable for engaging with the actuating device within the receiving vessel and the upper end of the stem is attached to a double cone shaped stopper. The stem is encased in a spring to hold the stopper in position.

Circular Valve Closure or Stopper

The closure is a double cone shaped stopper with a lower conical region which consumes approximately one quarter of the length of the stopper and an upper conical region which consumes approximately three quarters of the length of the stopper. The lower conical region has a diameter which decreases while moving closer to the bottom of the cone and serves to plug the round aperture in the cylindrical disc. Further, the conical shape of the lower conical region essentially makes the stopper self-guiding. It will seat properly into the round aperture in the disc even if not at the correct initial angle. The upper conical region decreases in diameter while moving upward and serves to promote and direct material flow.

Receiving Vessel

Another key feature of the invention is a receiving vessel that can interact with the valve via an actuating device in order to permit dispensing of the flowable material while said vessel is not full, and terminates dispensing of the flowable material when the vessel becomes full. Individual receiving vessel are designed and precalibrated for a particular predetermined volume of material. Consequently, an individual dispenser container can be used to dispense a nearly limitless number of different predetermined volumes of the flowable material.

The receiving vessel has several key features which render it useful in the claimed invention. In a current embodiment, the vessel itself is not required to be of any particular volume. Rather, the vessel holds an insert which serves both to control the dispensing volume and to anchor the actuating device. This insert consists of a cylindrical disc which forms a threaded aperture in its center suitable to secure the actuating device. The volume limiting disc is of a diameter less than the maximum diameter of the receiving vessel. Consequently, it will only penetrate a certain distance vertically into the vessel. Therefore, the sides of the vessel serve to hold the insert in place vertically.

The receiving vessel must have an aperture suitable to permit the inflow of the flowable material. In the simplest embodiment, said vessel has an open top. This easily permits flow into the receiving vessel. However, it does not place any limitations on what particular material flows into the vessel. In some cases, however, it is important to control the identity of the material dispensed. For example, a series of dispensing devices according to the claimed invention could be utilized to dispense a variety of different and incompatible chemicals.

Control is provided via a system of complementary configurations between valve seat, cap and receiving vessel. In short, a shaped skirt is provided which complements the shape of the respective aperture in the top of the receiving vessel. The skirt is of sufficient depth to prevent contact between the actuating device and the post or stem, thereby preventing dispensing of the material if the skirt configuration fails to match the receiving vessel.

In another embodiment, the actuating device can be in threaded attachment to the volume limiting disc. This permits the end user to modify the volume of the receiving vessel. Consequently, a single receiving vessel can be used for dispensing an infinite number of different volumes.

The actuating device protrudes through the aforementioned round aperture and extends down to the bottom surface of the cup. There, it is held in an indentation provided in the vessel for that purpose. Because the actuating device is permanently bonded to the insert, this serves to locate and hold the insert in place within the vessel.

Detailed Discussion of the Figures

Figure 1:
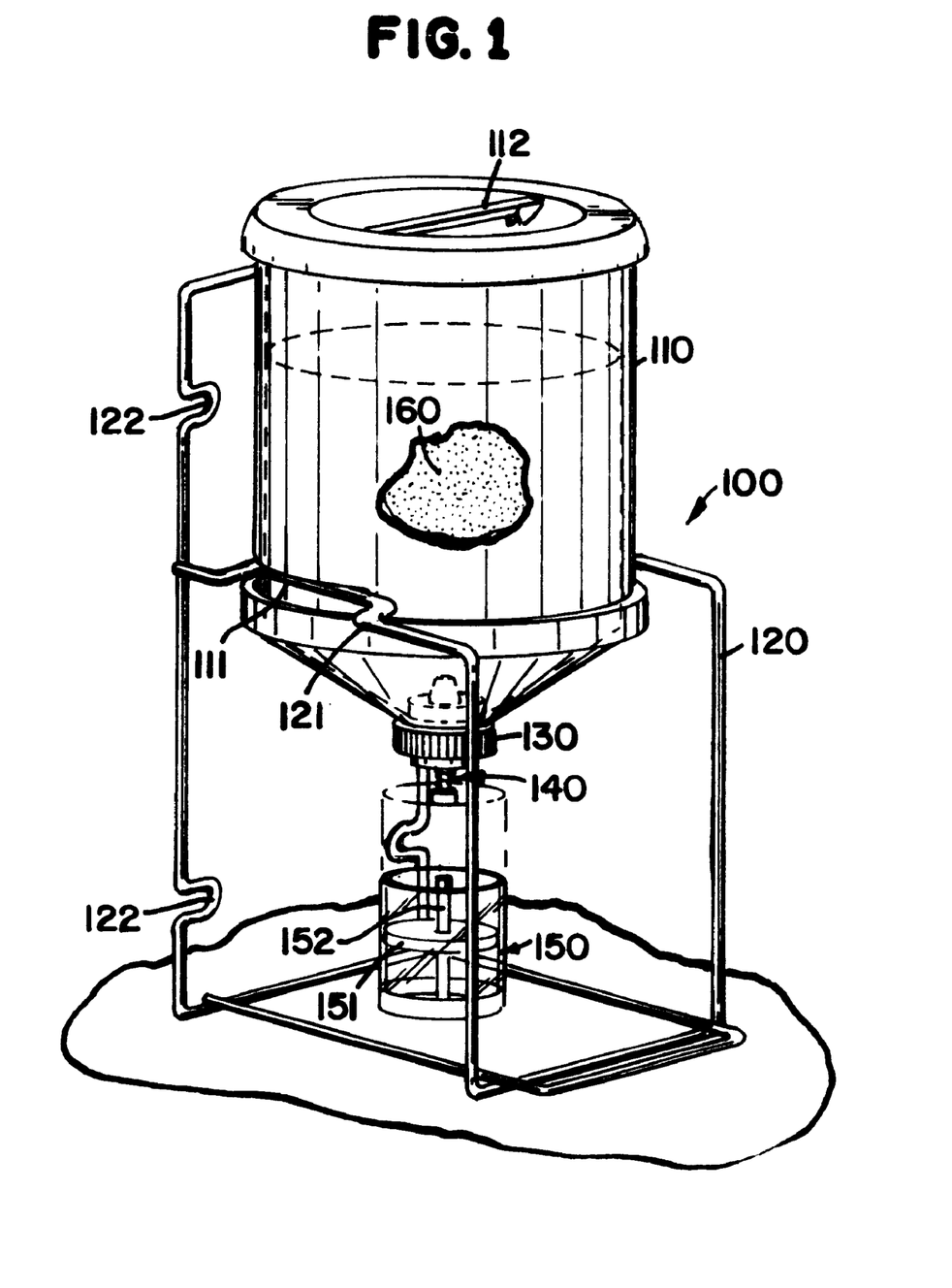
FIG. 1 is a perspective view of the free-flowing material dispensing apparatus of the claimed invention.

FIG. 1 is a perspective view of the apparatus 100 showing the major components of the invention. The container 110 is held in a gravity-dispensing mode or upside down by the stand 120, which is of a metal wire design. The bottle 110 contains the flowable material 160 to be dispensed through valve assembly 140 into receiving cup or flowable material vessel 150. The valve assembly 140 is held in place in the aperture of the container 110 by a cap 130.

Several features can be seen in this figure. The container 110 contains indentations 111 (only one seen) on each side of the container which serve to hold the bottle in the stand 120. The top of the container 110 includes a handle 112 for handling ease. The stand 120 has several additional features as well. There are two protrusions 121 (only one seen), which serve to hold the bottle 110 in place by fitting into the indentations 111. Further, the stand 120 also includes several hanging brackets 122 for the purpose of mounting the apparatus 100 on a vertical surface such as a wall. The receiving cup 150 contains a volume limiting disc 151 and an actuating device or probe 152.

Figure 2:
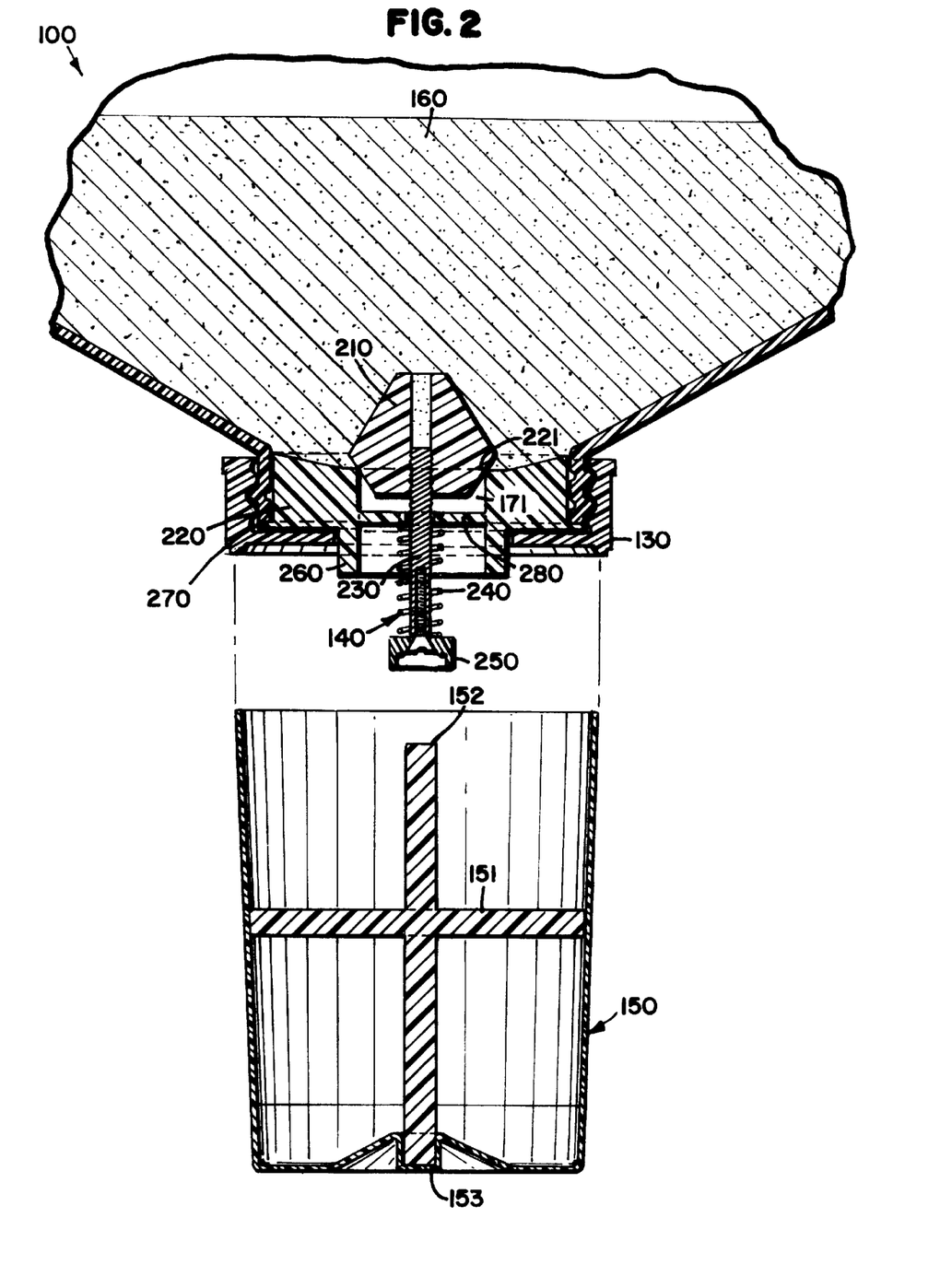
FIG. 2 is a cutaway view of a portion of FIG. 1.

FIG. 2 is an expanded side view of a portion of the apparatus 100 which shows the relationship between the container 110, valve assembly 140 and receiving cup 150. This view clearly shows how the valve assembly 140 protrudes through and is held in place by cap 130. The valve assembly 140 is seen to include a throat 171, a circular closure or stopper 210, a disc and seat 220 and an actuator post or stem 230. One end of the stem 230 is seen to be threaded for the purpose of attaching the stopper 210. Further, the valve assembly also includes a spring 240 which serves to bias or hold the valve closed when not in use, and a receiving surface 250 which interacts with the actuating device 152. This figure shows the threaded attachment or support apparatus 280 which traverses the aperture and lip 270 and provides guidance and support for the stem 230. Further, this diagram shows the actuating device holder 153 which is formed into the bottom of receiving cup 150 that cooperates with the volume limiting disc 151 to calibrate the vessel 150. The flowable material 160 is shown within the container 110. Further, the passage of material through the valve assembly 140 and into the receiving cup 150 can be explained via this diagram, which is drawn with the valve 140 in the closed position. The stopper 210 is clearly shown blocking the aperture 270 and throat 171 through the valve assembly 140. In this position, no flowable material 160 may flow. The receiving cup 150 is clearly shown as being empty of flowable material 160. When an empty receiving cup is brought into position directly beneath the valve assembly 140, the actuating device 152 engages the cup guide 250 and forces the stem 230 upward. This forces the stopper 210 upward (shown in FIG. 4) and permits the flowable material 160 to flow into the receiving cup 150.

When the receiving cup 150 is full, the flowable material 160 level within the cup will make contact with the skirt or flow stopper 260. This stops the flow of free-flowing material 160 into the receiving cup 150. When the receiving cup 150 is pulled away, the spring 240 forces the stopper 210 back into the closed position and prevents flow of any additional flowable material 160.

Figure 3:
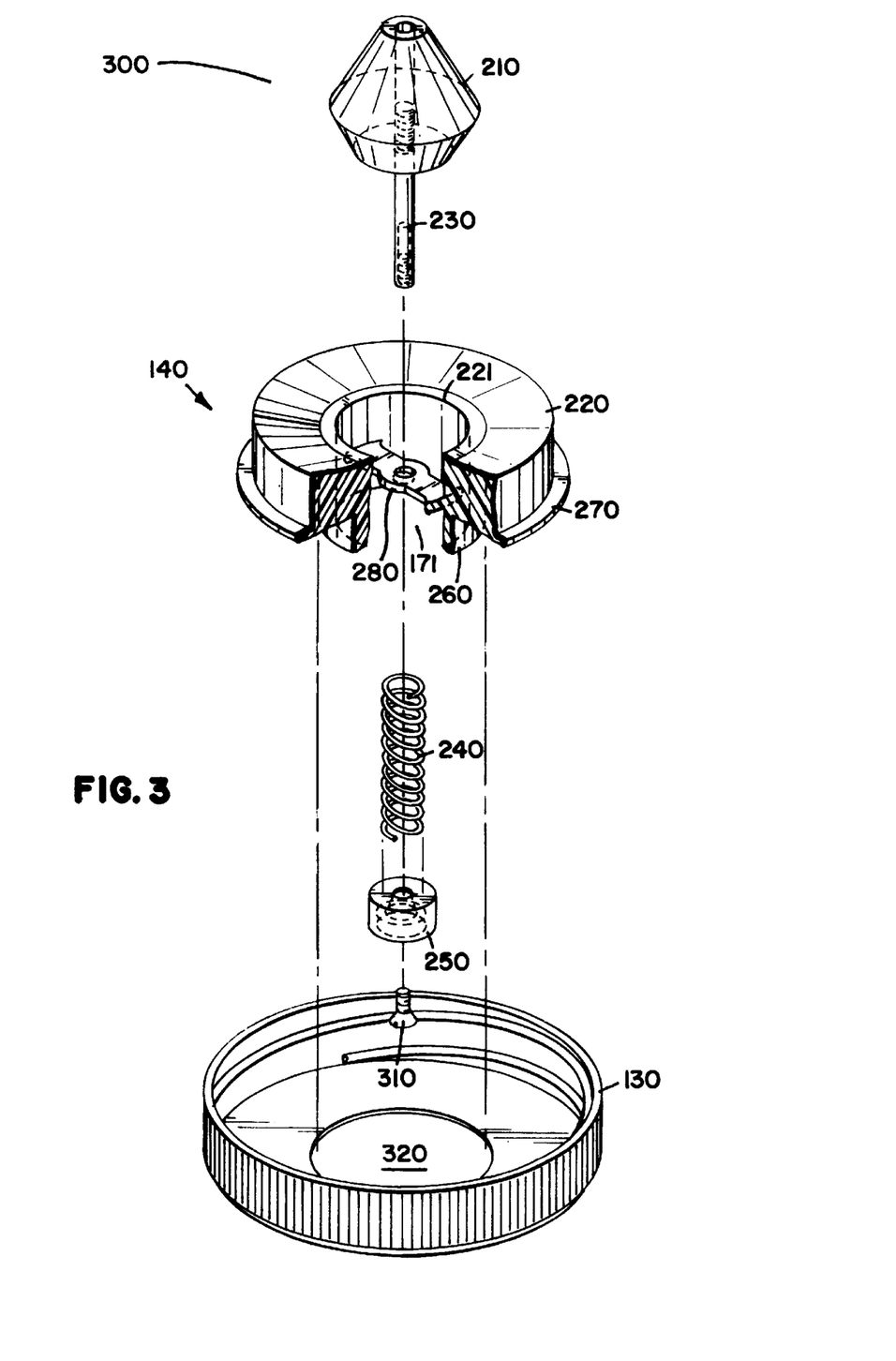
FIG. 3 is an exploded view of the valve assembly and threaded closure.

FIG. 3 is an exploded view 300 of the valve assembly 140 and container cap 130 which shows the vertical arrangement of these components. Most of the individual components in this figure have been described previously. However, this figure does provide a much better view both of the support apparatus 280 itself and its orientation both within the valve assembly 140 and to the stem 230. This figure also shows the screw 310 which serves to attach the receiving surface 250 to the post or stem 230, thereby capturing the spring 240. Finally, this figure shows the center knockout 320, located in the center of the cap 130. The circular closure having the dual conical surfaces 210 is shown. The circular closure 210 cooperates with seat 221 to seal the throat 171 in the valve. Seat 221 is formed in the disc 220. Disc 220 contains a lip that cooperates with a threaded opening in the container. The disc 220 contains a skirt or flow stopper 260 which contacts the flowable material as it fills the vessel thus stopping free-flowing material transfer from the container to the vessel. The cup guide or probe receiver means 250 is attached to the post or stem 230 using a screw 310 in a preferred mode. The guide 250 holds the spring 240 on the post 230. The spring 240 biases the circular closure or stopper closed against the seat 221. The valve assembly is held in the threaded opening to the container using the cap 130 with the optional knock-out 320. When the circular closure 210 is positioned in an open location, the flowable material flows around the circular closure 210 through the aperture 270 and the knockout opening 320 into the vessel for the flowable material.

Figure 4:
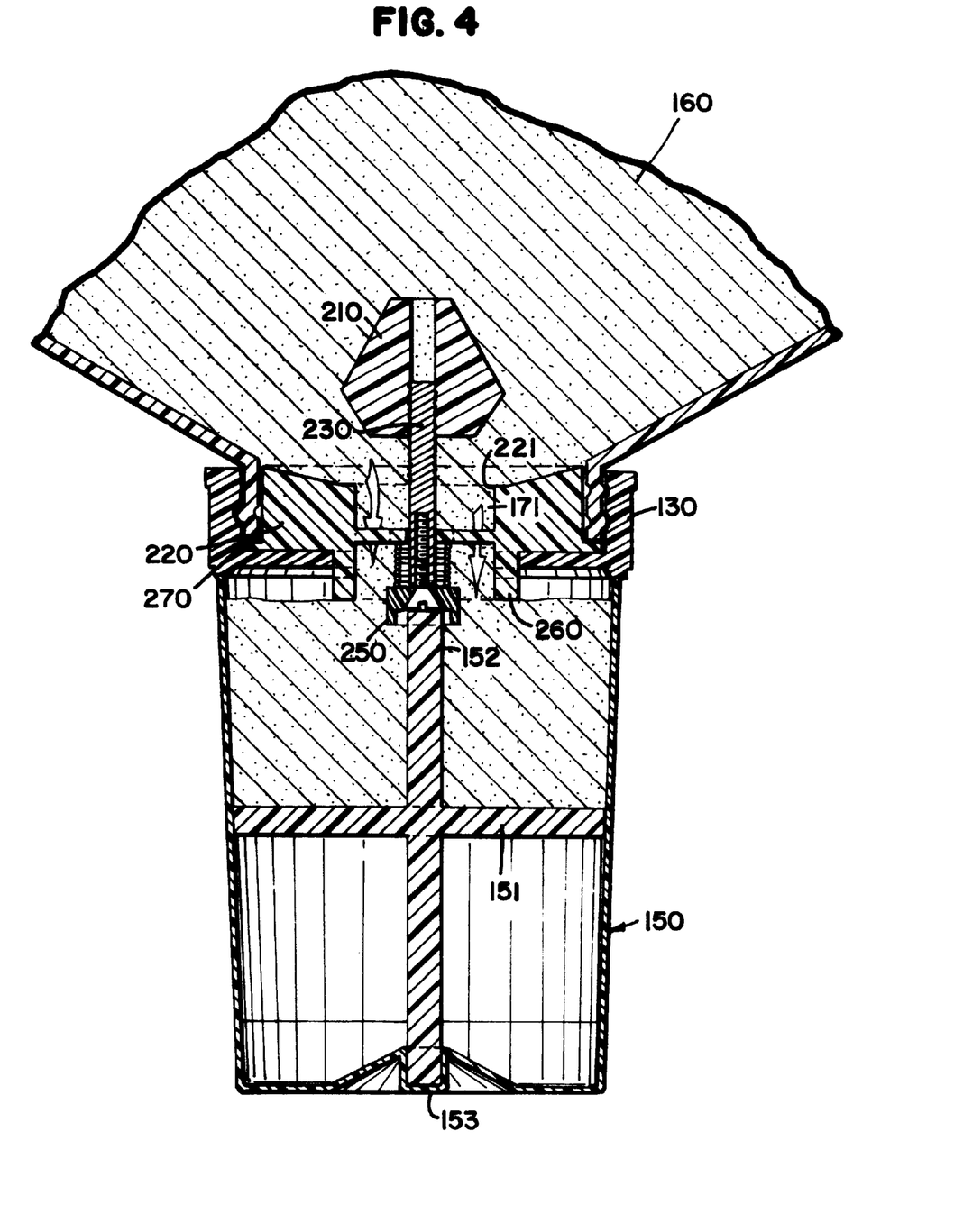
FIG. 4 shows the self-limiting free-flowing material filling feature of the valve, skirt and flowable material vessel.

FIG. 4 shows vessel 150 in contact with the valve assembly 130 at the edge 270 using the actuator probe 152 in contact with the actuator post receiving surface 250. The probe 152 and the volume limiting disc 151 cooperate to calibrate the volume of the vessel 150. Flowable material 160 flows through the throat 171 and has filled the vessel 150 such that the flowable material 160 level reaches the skirt 260 stopping the flow of the flowable material. When vessel 150 is withdrawn from the valve, the actuator post 230 returns the closure 210 to the seat 221 preventing dispensing substantially more flowable material 160. This feature is a self-limiting feature in the flowable material dispenser apparatus.

FIG. 5 shows several possible embodiments of the skirt 260, cap 130 and receiving vessel 150. In each case, the skirt 260 and the flowable material receiving vessel 150 possess complementary shapes and fit together in a lock-and-key manner. The invention is not limited to the particular embodiments displayed. Any suitable configuration of skirt and receiving vessel top could be used. These embodiments are intended only to illustrate the idea.

Figure 5A:
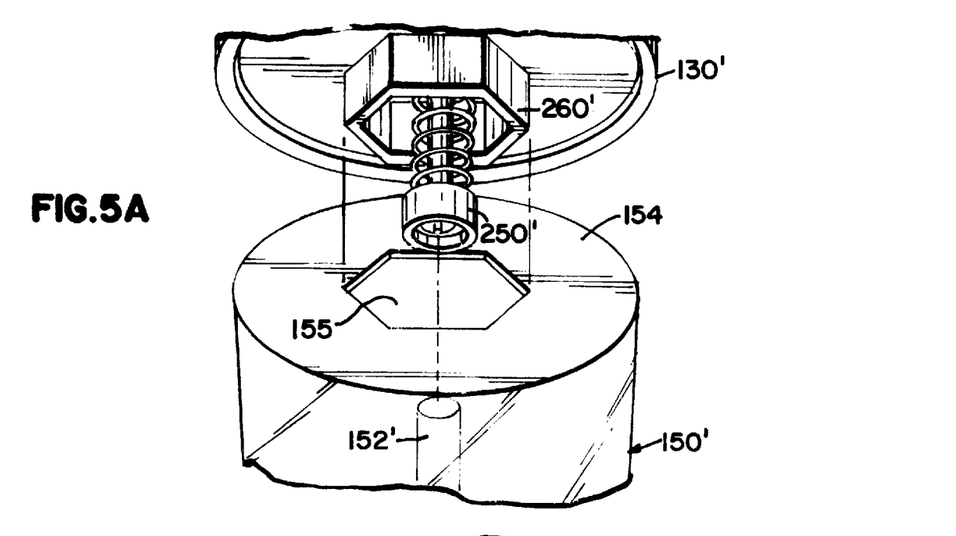
FIG. 5 shows the interaction between several possible embodiments for the skirt and cap.

FIG. 5A shows a portion of the valve assembly 140 bearing a particular skirt embodiment 260', a particular receiving vessel 150' and cap 130'. This figure clearly shows the idea of a complementary skirt and receiving vessel configuration and further demonstrates that the cup guide 250' can not make contact with the actuating device 152' unless the skirt 260' penetrates the top 154 of the receiving vessel 150'.

Figure 5B:
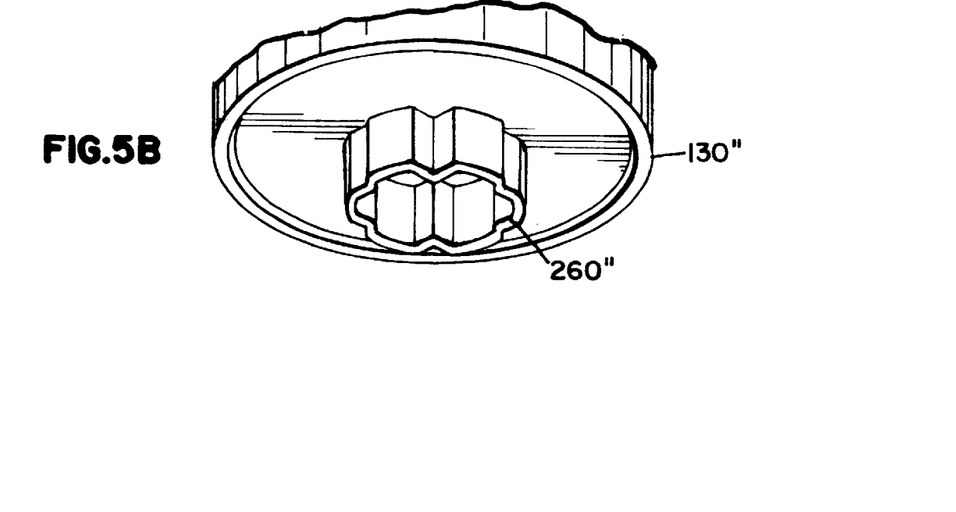

FIG. 5B shows another possible embodiment. Pictured is a skirt 260" and cap 130". The complementary receiving vessel top (not pictured) would comprise an aperture suitable to permit penetration by skirt 260".

Figure 5C:
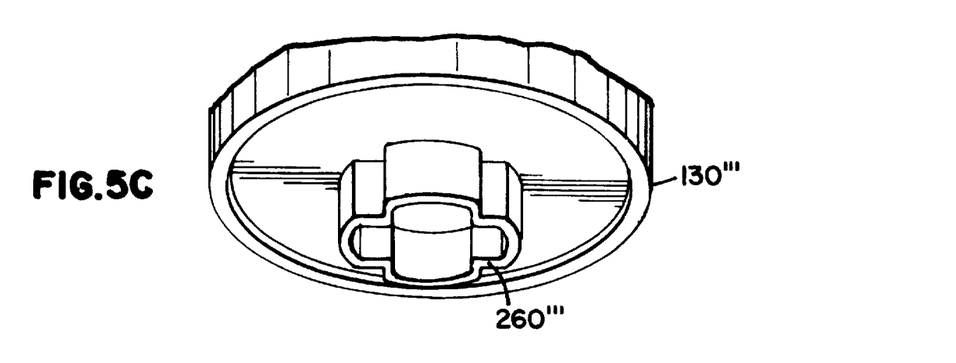

FIG. 5C shows another possible embodiment. Pictured is a skirt 260''' and cap 130'''. The complementary receiving vessel top (not pictured) would comprise an aperture suitable to permit penetration by skirt 260'''.

Virtually any flowable chemical useful for dilution in a liquid diluent can be dispensed using the apparatus of the invention. Preferably, the flowable chemical is aqueous dispersible or soluble. Typically in use, the chemical is measured into a volumetric cup, calibrated for appropriate dilution ratios until the cup is accurately and precisely filled with a measured volume of chemical. The chemical is then transferred to a mixing or storage tank in which it is combined with diluent to form an active aqueous or non-aqueous solution. The volume in the measuring cup is matched to the volume of the mixing or storage tank.

Chemical flowable materials can include flowable liquid, powder, granule, pellet, etc., laundry detergents, dishwashing detergents, antimicrobial or sanitizing materials, manual dish, pot or pan cleaners, oxidant bleaches, flowable products used for forming treatment materials for dairy animals including teat dips, utter washes, etc., floor cleaners, hard surface cleaners, fertilizers, insecticides, fungicides, herbicides and any other flowable material having an active water soluble or dispersible ingredient.

Warewashing detergents typically have a source of alkalinity, a sequestering agent, and a variety of optional ingredients including chlorine sources, anticorrosion ingredients, wetting agents or surfactants, dyes, perfumes, anticorrosion agents, etc. Sources of alkalinity can include carbonate salts, silicate salts, alkali metal hydroxides and other inorganic materials. Chlorine sources can include encapsulated chlorine sources, sodium chlorite and others. The other ingredients are commonly available and can provide associated activities with an effective concentration in the detergent composition.

Laundry detergents are typically mildly or highly alkaline materials containing a substantial proportion of anionic and/or nonionic surfactants for soil removal. The laundry detergents can also contain a variety of other ingredients including hardness sequestrants, bleaches, antiredeposition agents, inorganic diluents or fillers, water or fabric softening agents, etc. Such laundry detergents are typically manufactured by dosing the organic materials onto and absorbing the organic materials into the organic components and then dry blending the combined inorganic organic materials to form uniform laundry detergent.

Flowable material sanitizers that can be dispensed with the apparatus of the invention include materials containing chlorine containing compounds such as hypochlorite, chlorine dioxide, quaternary ammonium sanitizer compounds, iodophors, acid anionic materials and others. Such compositions if unstable can be encapsulated and can be combined with diluent salts such as sodium sulfate, sodium carbonate, sodium bicarbonate, etc. Similarly, chlorine bleaches and oxygen bleaches can be formulated in free-flowing material form and dispensed using the apparatus of the invention. In such compositions, typically a chlorine source is encapsulated with inorganic, organic or mixed or layered coatings, to render the chlorine source compatible with diluent materials. Less oxidizing peroxygen or oxygen bleaches such as perborate and others can be formulated with bleach activators and a diluent salt in useful compositions.

Other fertilizers, floor cleaners, hard surface cleaners, insecticides, fungicides, herbicides, etc. can be obtained from sources of such materials and can be diluted with appropriate proportions according to bag instructions. In the case of use of a liquid material, the liquid material can be blended with a flowable diluent such as sodium sulfate, sodium carbonate, sodium bicarbonate, etc. in a ribbon blender prior to dispensing from the apparatus of the invention.

Many flowable materials are hygroscopic, i.e., they can absorb water from the atmosphere. Exposure of these materials to moisture can result in caking which may disrupt flow. If the invention is used with a sealable flowable material container, the exposure to ambient air is minimized. This is important because an equilibrium exists between water vapor in the air and water absorbed by the hygroscopic material. Constant exposure to ambient air would disrupt this equilibrium, causing excessive water absorption.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A flowable material dispenser system that can fill a flowable material vessel with a predetermined volume of flowable material, the system comprising:
   (a) a stand;
   (b) a bulk flowable material container with a gravity-feed flowable material valve outlet, the container installed in the stand;
   (c) a flowable material vessel having a predetermined volume and a valve actuator probe, the vessel and probe positioned to actuate the valve and receive a volume of flowable material;
wherein the valve comprises a valve disc with a circular valve seat and a conical closure having an open position and a closed position in contact with and closing the circular seat, the conical closure additionally comprising an actuator post that can interact with the vessel actuator probe to place the conical closure in an open position, the valve disc also comprising a skirt portion surrounding the seat opposite the conical closure, the top of the vessel surrounds the skirt portion and the skirt portion enters the top of the vessel by an amount of at least 1 millimeter, the seat cooperating with the flowable material in the flowable material vessel to stop flowable material flow when the vessel is filled to a predetermined volume.

2. The system of claim 1 wherein the conical closure is biased to a closed position in contact with the seat.

3. The system of claim 2 wherein the biased position is obtained using a bias spring.

4. The system of claim 1 wherein the conical closure has a conical surface in contact with the seat and a second conical surface opposite the conical surface in contact with the seat.

5. The system of claim 1 wherein the actuator post comprises a receiving surface that can cooperate with the actuator probe.

6. The system of claim 1 wherein the valve disc seat conical closure and skirt are incorporated into a threaded closure that cooperates with a threaded receiver in the container.

7. The system of claim 1 wherein the flowable material vessel is a substantially cylindrical vessel having a movable platform to set the predetermined volume.

8. The system of claim 7 wherein the cylindrical vessel increases in radius from the bottom to the top.

9. The system of claim 1 wherein the stand comprises a wire stand.

10. The system of claim 9 wherein the container is placed in the wire stand such that the actuator post of the valve can be accessed by the flowable material vessel for dispensing the flowable material.

11. A powder dispenser system that can fill a powder vessel with a predetermined volume of powder, the system comprising:

(a) a stand;

(b) a bulk powder container with a gravity-feed powder valve outlet, the container installed in the stand;

(c) a powder vessel having a predetermined volume and a valve actuator probe, the vessel and probe positioned to actuate the valve and receive a volume of powder;

wherein the valve comprises a valve disc with a circular valve seat and a conical closure having an open position and a closed position in contact with and closing the circular seat, the conical closure additionally comprising an actuator post that can interact with the vessel actuator probe to place the conical closure in an open position, the valve disc also comprising a skirt portion surrounding the seat opposite the conical closure, the top of the vessel surrounds the skirt portion and the skirt portion enters the top of the vessel by an amount of at least 1 millimeter, the seat cooperating with the powder in the powder vessel to stop powder flow when the vessel is filled to a predetermined volume.

12. The system of claim 11 wherein the conical closure is biased to a closed position in contact with the seat.

13. The system of claim 12 wherein the biased position is obtained using a bias spring.

14. The system of claim 11 wherein the conical closure has a conical surface in contact with the seat and a second conical surface opposite the conical surface in contact with the seat.

15. The system of claim 11 wherein the actuator post comprises a receiving surface that can cooperate with the actuator probe.

16. The system of claim 11 wherein the valve disc seat conical closure and skirt are incorporated into a threaded closure that cooperates with a threaded receiver in the container.

17. The system of claim 11 wherein the powder vessel is a substantially cylindrical vessel having a movable platform to set the predetermined volume.

18. The system of claim 17 wherein the cylindrical vessel increases in radius from the bottom to the top.

19. The system of claim 11 wherein the stand comprises a wire stand.

20. The system of claim 19 wherein the container is placed in the wire stand such that the actuator post of the valve can be accessed by the free-flowing material vessel for dispensing the powder material.

* * * * *